United States Patent [19]
Nehring

[11] 4,442,792
[45] Apr. 17, 1984

[54] HOG FINISHING BUILDING

[76] Inventor: Arthur C. Nehring, 107 Michigan, Iowa Falls, Iowa 50126

[21] Appl. No.: 95,634

[22] Filed: Nov. 19, 1979

Related U.S. Application Data

[63] Continuation of Ser. No. 875,407, Feb. 6, 1978, abandoned.

[51] Int. Cl.³ .............................................. A01K 1/00
[52] U.S. Cl. ........................................ 119/16; 119/20
[58] Field of Search ........................ 119/16, 20, 27, 28

[56] References Cited
U.S. PATENT DOCUMENTS

| | | | |
|---|---|---|---|
| 436,902 | 9/1890 | Osborn | 119/16 |
| 2,255,806 | 9/1941 | Overson | 119/20 X |
| 3,011,475 | 12/1961 | Golay | 119/20 |
| 3,213,828 | 10/1965 | Sorensen | 119/20 |
| 3,601,096 | 8/1971 | Rutherford | 119/16 |

Primary Examiner—Hugh R. Chamblee
Attorney, Agent, or Firm—James C. Nemmers

[57] ABSTRACT

A finishing building for hogs designed to defer to the natural laws of biological behavior. The building design allows the hogs to satisfy their exploratory drive while still providing areas for the hogs to rest, feed, etc. if they wish. The design of the building provides multiple rest areas physically separated by low walls but connected by passageways that allow the hogs to wander from area to area. Also, the rest areas are physically separated from the feeding areas, and the waste areas are also separate. The building employs the module concept, and when a number of the modules are combined into a single building, a maze effect results which produces both the nook desired for the rest areas while allowing the hogs maximum room to explore. The building also has a unique design which provides heating, cooling and ventilating of the interior without supplemental equipment.

6 Claims, 7 Drawing Figures

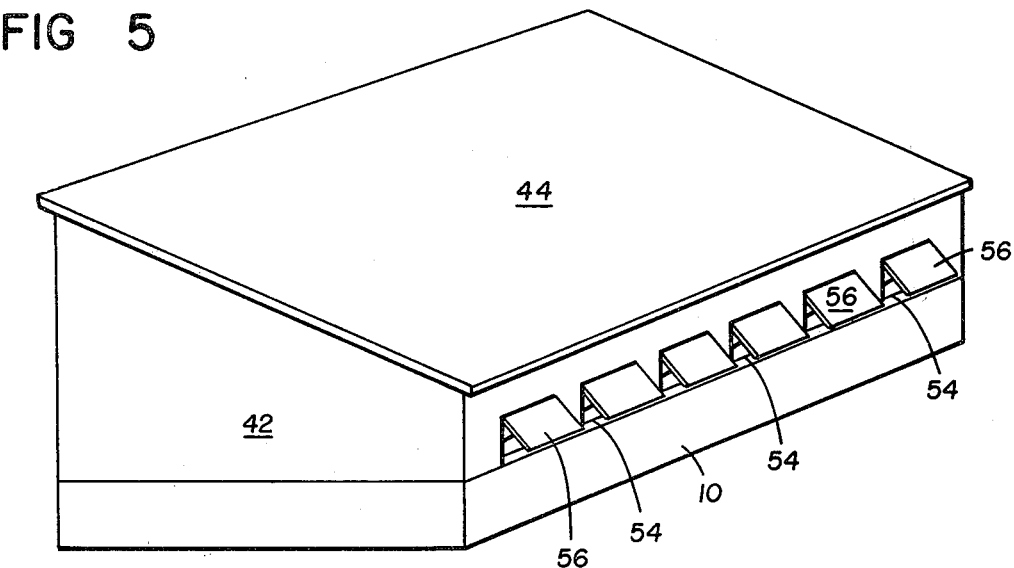
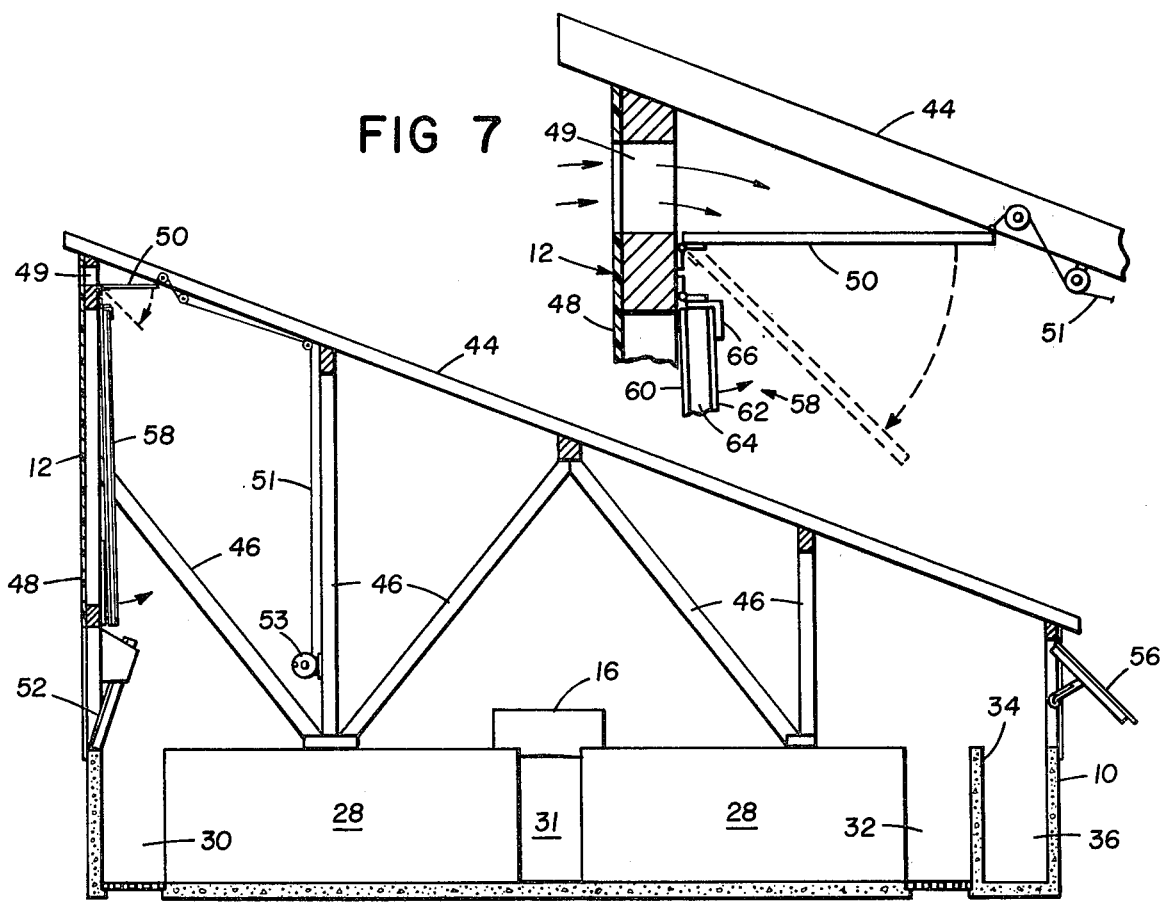

HOG FINISHING BUILDING

This is a continuation, of application Ser. No. 875,407, filed Feb. 6, 1978 now abandoned.

BACKGROUND OF THE INVENTION

Anyone who has studied the natural laws of biological behavior is familiar with the principle that the frustration of mobility by forced confinement is vigorously avoided by animals. When such confinement continues for an extended period of time, the animal's body degenerates and will die. Moreover, aggression results from frustration caused by confinement. These well known principles are stated in the text "Principles of General Psychology" By Kimble and Garmenzy (1968).

However, these natural laws of biological behavior are constantly violated by those who breed and raise hogs with the result that the hogs will fight with each other when confined in small pens. It is elementary that prolonged stress weakens the body against disease. The modern solution to animal disease is to treat the symptoms with drugs rather than prevent the cause of the disease. Thus, it is no wonder that the disease, the fighting and scrapping among the hogs and other anti-social behavior resulting from confinement is a major cause of losses to the hog producer.

Most hog shelter facilities are not designed with the hog in mind but rather are designed merely to confine the hogs. The basic design of presently known hog shelter buildings is to divide the building into a number of small pens, and the hogs are generally overcrowded within each pen area. This results in the confinement diseases and anti-social behavior discussed above. Also, when confined in a small pen area, the pen area will become contaminated with wastes from the hogs, and the hogs will make no effort to keep their pen area clean. Besides the additional adverse effect on the hogs, this makes the cleaning task even more difficult for the hog producer.

It is, therefore, a principal object of the invention to provide a hog finishing building which will confine the hogs while at the same time allow the hogs to feel they are free to get out, thereby minimizing the stress on the hogs and improving their health and growth rate.

It is a further object of the invention to provide a hog finishing building in which there are provided multiple rest areas physically separated from each other but which are all interconnected by passageways.

It is a further object of the invention to provide an improved hog finishing building designed to utilize the dynamics of natural thermal air currents for ventilation during all seasons and to utilize solar energy for heating, thereby minimizing the amount of energy needed to heat the building in the winter and cool it in the summer.

SUMMARY OF THE INVENTION

The invention overcomes the problems and difficulties of prior art hog confinement buildings by utilizing relatively simple structural techniques which divide a large building into multiple rest areas, a common feed area and passageways interconnecting the various areas without interfering with the semi-privacy created in the rest areas. The invention divides the hog finishing building into a central feeding area with rest areas on each side of the feeding area physically separated from the feeding area by low walls. These low walls extend longitudinally along the feed area physically separating it from the outer areas which are utilized for rest areas. Individual rest areas are created by a number of low walls extending transversely outwardly from the longitudinal walls thus forming T-shaped partitions. Walkways are provided along the outer walls extending longitudinally of the building, and passageways are provided from each rest area into the centrally located feeding area. Each module of a feeding area and four rest areas, two on each side of a feeding area, are then separated by additional low walls extending transversely of the building. Depending upon the desired capacity of the finishing building, these modules are repeated as needed, and each module is connected centrally and along each side by a passageway. Thus, free access is permitted among all of the rest areas and feeding areas throughout the entire building.

In addition, the low walls are preferably made of concrete, and one side of the building is preferably oriented to the South and provided with ventilators and translucent panels which allow the passage of fresh air and the sun's rays into the building. Beneath the translucent panels are windows, and the opposite side of the building is also provided with windows so as to provide full and complete ventilation of the building. With this design, solar energy can be utilized to maintain the temperature of the building throughout the day and the night at a reasonably comfortable level without the use of supplemental heat. The many low walls constructed of concrete absorb heat from the sun during the day and release the heat during the night hours. Also, because of the excellent ventilation provided by the building design, no ventilating fans are needed.

BRIEF DESCRIPTION OF THE DRAWINGS

FIG. 5 is a perspective view of the hog finishing building showing the North longitudinal wall;

FIG. 6 is an end view of the interior of the hog finishing building of the invention; and FIG. 7 is an enlarged end view of the area where the South wall joins the roof and illustrates the building design for utilizing the natural thermal air currents for ventilating the building.

DESCRIPTION OF THE PREFERRED EMBODIMENT OF THE INVENTION

Figure 1:
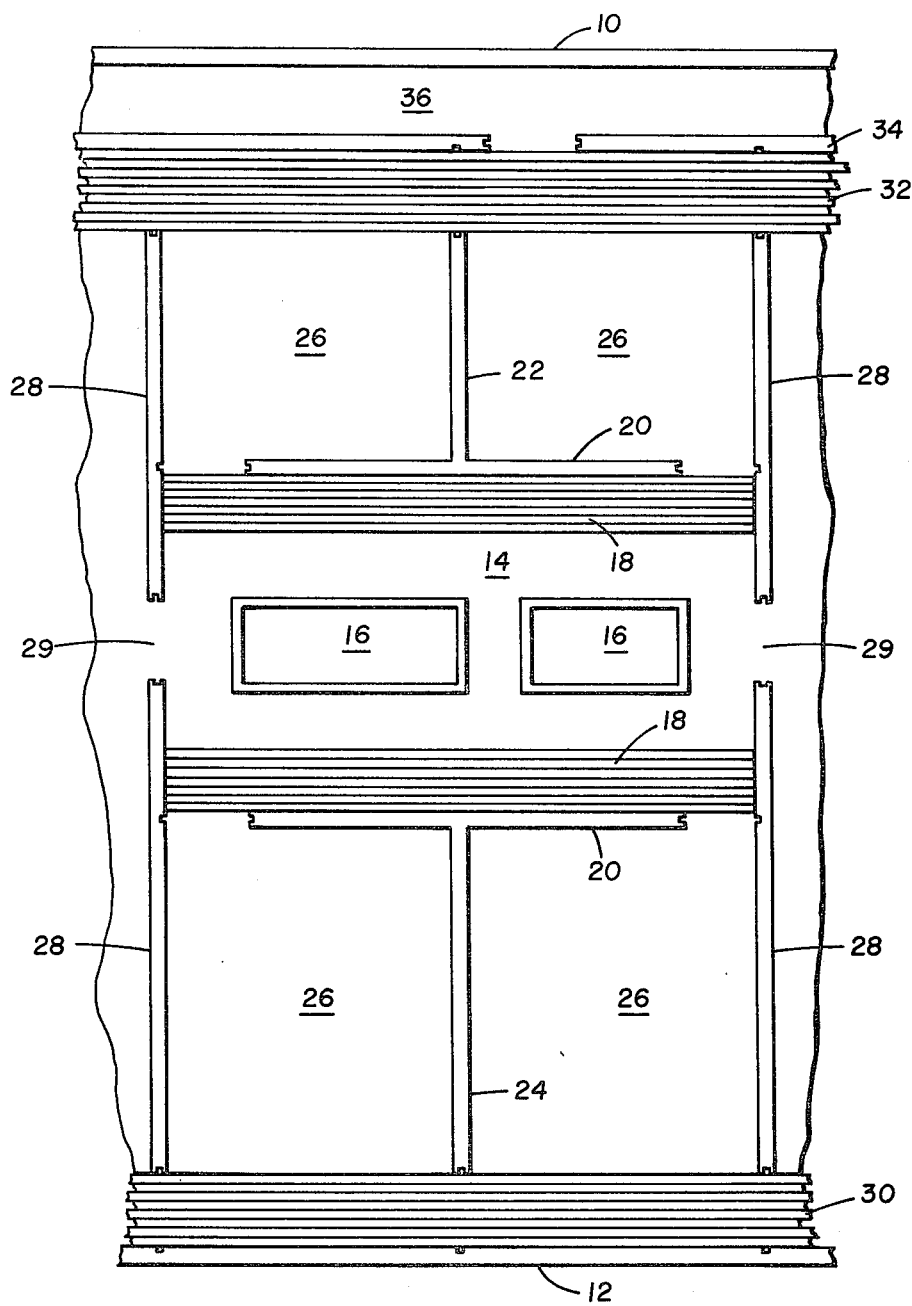
FIG. 1 is a plan view of a portion of a hog finishing building showing one of the modules that employ the principles of the invention.

In FIG. 1 there is a plan view of a portion of the interior of a hog finishing building which plan view illustrates the principles of the invention. The hog finishing building has a longitudinally extending wall 10 which preferably faces the North and a parallel longitudinally extending wall 12 which faces the South. The particular design of these walls will be described more fully hereinafter. The central portion of the building is divided into feeding areas 14 in which there are located suitable feeders 16 that can be filled manually or by a feed conveying system (not shown) extending longitudinally of the building above the feeders 16. The floor areas along the outer portions of the feeding areas 14 are slotted as at 18, these slotted floor areas extending above manure pits to permit the ease of maintenance and disposal of the wastes. The feeding areas 14 are defined by longitudinally extending side walls 20 which are preferably low walls of approximately 30 inches in height. These side walls 20 are preferably constructed of concrete.

Extending transversely outwardly from a side wall 20 toward the North wall 10 is a partition 22. Similarly, extending outwardly toward the South wall 12 from the other side wall 20 is another partition 24. These partitions 22 and 24 divide the areas outside of the feeding area 12 into four rest areas each designated by the reference numeral 26. The T-shaped walls formed by the juncture of partitions 22 and 24 with the side walls 20 provide natural nesting nooks for the hogs within each rest area 26. Each of the partitions 22 and 24 are also low walls being of the same height as the side walls 20. Moreover, partitions 22 and 24 are also preferably constructed of concrete.

There are also provided end walls 28 which extend transversely of the building along each end of a rest area 26 so that the rest areas are somewhat enclosed and semi-private. The end walls 28 extend from the center of the building toward the South wall 12 and the North wall 10, but the end walls 28 terminate short of each other at the center to provide a passageway 29 and terminate short of the North wall 10 and South wall 12. Also, the partitions 22 and 24 terminate short of the North wall 10 and South wall 12 as best seen in FIG. 1. End walls 28 are also low walls of the same height as partitions 22 and 24 and side walls 20, and end walls 28 are also constructed of concrete.

Because the end walls 28 and partitions 22 and 24 all terminate short of the North wall 10 and South wall 12, a longitudinally extending passageway 30 is provided along the South wall 12 and a similar longitudinally extending passageway 32 is provided near the North wall 10. However, there preferably is provided a longitudinally extending inner North wall 34 which is parallel to and spaced inwardly from a North wall 10 to provide a continuous walkway 36. The floor area along the passageways 30 and 32 are preferably slotted so as to provide the disposal of wastes similar to the slotted floor areas 18 in the feeding areas 14.

Figure 2:
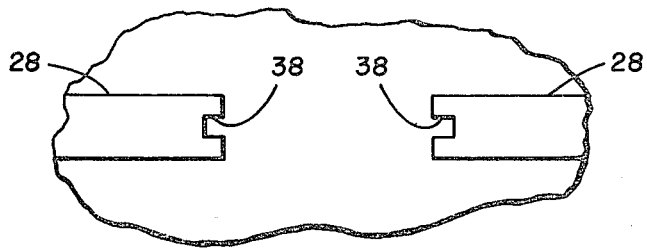
FIG. 2 is an enlarged plan view of the ends of two partitions which form a passageway.

As previously indicated, the end walls 28 and the partitions 22 and 24 all terminate short of the South wall 12 and the inner North wall 34. The spacing between the ends of partitions 22 and 24 and the South wall 12 and the inner North wall 34 are equal and are equal to the spacing between the ends of the side walls 20 and the end walls 28. Also, the spacing between the ends of all of the inner partition walls are the same as passageway 29 formed between the inner ends of walls 28. As illustrated in FIG. 2, the end of each wall within the building, and where required the inner North wall 34 and the South wall 12, are provided with vertical grooves 38. This allows a standard size panel 31 (FIG. 6) to be dropped into the space formed between any two walls to block off any of the passageways where this might be desired. For example, when the breeder decides to sort the hogs by size for selling, they can be confined into certain designated areas. Normally, however, all of the passageways are left open. Thus, the hogs can move freely throughout the entire building and can freely move from the feeding area 14 to any one or more of the rest areas 26. The plan shown in FIG. 1 is of a single module which, of course, can be repeated throughout the hog finishing building depending upon desired capacity of the building. As previously indicated, the walkway 36 is formed between the inner wall 34 and the North wall 10, and any of the openings in the inner wall 34 can be blocked off by panels 31 to keep the hogs from the walkway which is used primarily for the breeders when they wish to gain access to any area within the building.

Referring now to FIGS. 3, 4, 5 and 6, the remaining design of the building is illustrated. In addition to the North wall 10 and South wall 12, the building is provided with exterior end walls 40 and 42 and a roof 44 which encloses the building and slopes downwardly at a pitch of slightly more than three-to-one from the South wall 12 to the North wall 10. Suitable supporting members 46 extend from the various interior walls to the roof 44 as shown in FIG. 6. Thus, the interior partitions and walls which define the rest areas 26 and the feeding area 14 serve a structural purpose in addition to their primary purpose of dividing the interior of the hog confinement building in the manner described.

Figure 3:
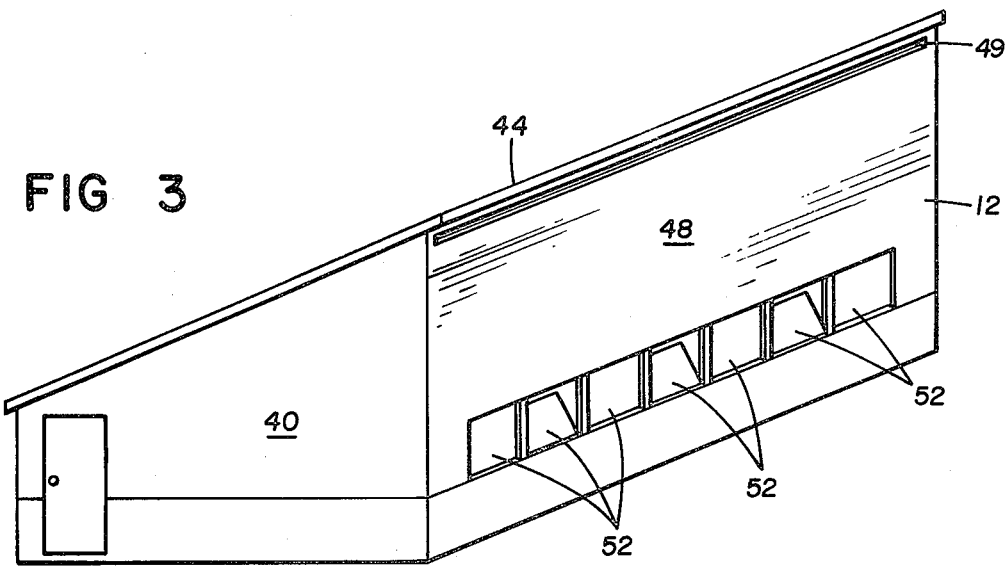
FIG. 3 is a perspective view of the exterior of the hog finishing building and showing the South longitudinal wall.
Figure 4:
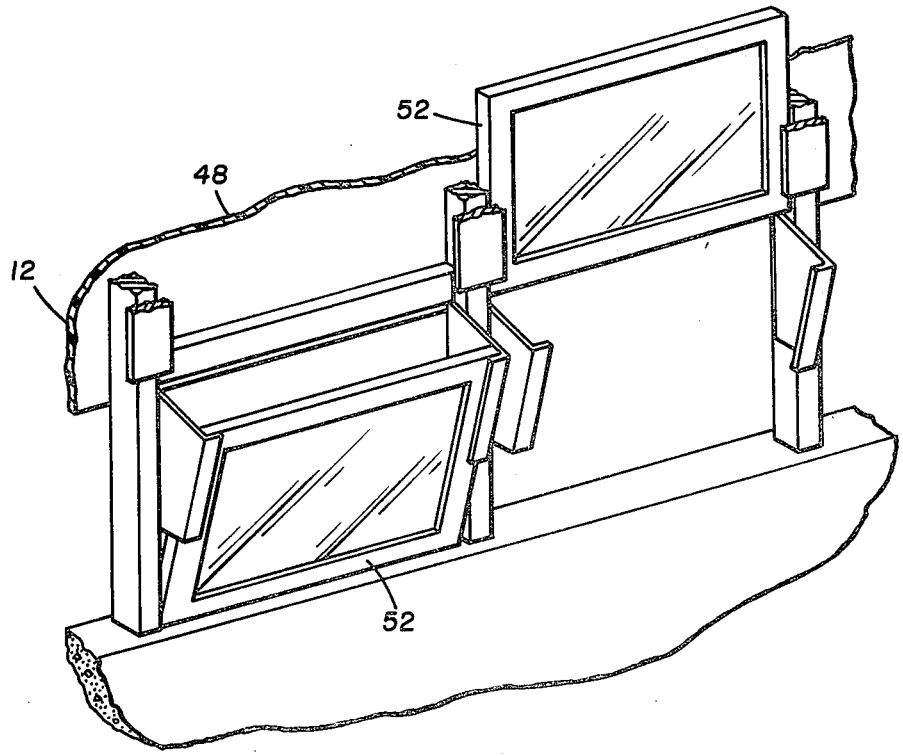
FIG. 4 is an enlarged perspective view of a portion of the South wall showing the arrangement of the windows to provide maximum ventilation.

Referring to FIG. 3, the South wall 12 is shown and is a wall considerably higher than the North wall 10. Substantially the entire upper area of the South wall 12 is constructed of translucent panels 48 which will freely admit the rays of the sun. A small area 49 just below the roof 44 is open along the entire length of South wall 12 to permit the exit of inside air from the building in order to make full use of the dynamics of the natural thermal air currents. The amount of air flowing out of the building due to the dynamics of the natural thermal air currents is regulated by a louver 50 that is pivotally mounted on the South wall 12 and movable from a closed position in which the outer edge of louver 50 engages the undersurface of roof 44 to a fully open position in which the louver 50 is swung downwardly to a position against the South wall 12. This is illustrated in FIG. 7. Movement of the louver 50 to a selected position can be controlled in any suitable manner such as by a cable 51 affixed at one end to the louver 50 and wound on a manually operated windless 53 located at a convenient place (see FIG. 6).

Beneath the panels 48 of South wall 12 are a plurality of windows 52 which extend substantially the entire length of the South wall 12. Windows 52 are preferably vertically slidable to a fully open position inside of panels 48, and when in the lowest position preferably can be pivoted inwardly along their lower edges to regulate the air flow. Windows 52 and louver 50 are arranged therefore to provide flexibility in ventilation depending upon the particular weather conditions or season of the year.

In FIG. 5 there is shown the North wall 10 of the building which wall also has a plurality of windows 54 extending along substantially the entire length of the North wall 10. These windows are preferably provided with awning type panels 56 hinged at the top.

With the foregoing described construction, the high South wall 12 with translucent panels 48 admits the maximum solar energy during the winter months due to the low angle of the sun during the winter season. In have found that a sufficient amount of solar energy can be admitted to the building during the daytime to maintain the interior at a comfortable level for the hogs without the use of supplemental heat. Since all of the interior walls and partitions are constructed of concrete, these walls will absorb a considerable amount of heat during the daytime and release this heat at night thus maintaining the interior of the building at a comfortable level without the use of supplemental heat. In the summer, the building design does not admit the direct ray's of the sun so that the hogs can always find shade.

The design and selection of the windows 52 and louver 50 on the South wall 12 and the windows 54 and awning-type panels 56 along the North wall provide maximum flexibility for ventilating the interior of the building during all weather conditions. Regardless of the direction of the then prevailing winds, the interior of the building will be ventilated without the use of any ventilating fans or other mechanical devices. The level of both windows 52 and 54 is above the height of the various interior walls and partitions and thus ventilate the interior without admitting cool breezes directly on the hogs housed in the building.

Thermal insulation walls 58 are preferably provided beneath the area 49 and above windows 52 inside of South wall 12. One of these walls is illustrated in FIGS. 6 and 7 and includes a pair of spaced-apart translucent panels 60 and 62 affixed to a wooden frame 64 that may be reinforced with metal angle irons 66 to prevent warping. The panels 60 and 62 are preferably sealed around the frame 64 to provide a dead air space between them. The walls 58 abut each other along the entire length of South wall 12, and each wall is hinged in any suitable manner along its top edge so that it can be swung inwardly for purpose of cleaning.

I have found that using the building layout and construction of the invention, psychologically the hogs are much more contented. Since the hogs can explore freely into any area of the building, they will tend to leave groups of other hogs where they are not wanted. Generally, the hogs can find a rest area where they can hide from other hogs, and because of the maze there is, to the hog, no end to the new horizons he can explore. The hogs can also move freely into and out of the feeding areas. I have also found that because the hogs are not confined, they do not build up aggression, and because of the nesting nooks provided by the walls in the rest areas the hogs will nest there and actually keep the rest areas clean, thus making it much easier to maintain the interior of the finishing building free from wastes. I have provided slotted floor areas along the outside of the feeding areas and outside of the rest areas, and I have found that the hogs will deposit their wastes in these areas, thus naturally keeping the rest areas clean and the hogs even more satisfied. My unique maze design thus reduces fighting and scrapping among the hogs, minimizes disease and therefore increases the productivity of the hog producer. I have found that the only diseases that the hogs develop are brought in by new feeder pigs.

Morover, because of the particular design of the building from the heating, cooling and ventilating standpoint, the hogs are maintained at a comfortable temperature during all seasons without the expense of providing supplemental heating and ventilating equipment. In brief, the novel aspects of my hog finishing building are designed with the hog in mind, and thus provide for more contented and healthier hogs resulting in increased productivity and maximum profits for the hog producer.

Having thus described my invention in connection with a preferred embodiment thereof, it will be obvious to those skilled in the art that various revisions and modifications can be made in the particular embodiment disclosed herein. It is my intent, however, that all such revisions and modifications as are obvious to those skilled in the art will be included within the scope of the following claims.

I claim:

1. A hog finishing building for growing and finishing hogs and the like, said building comprising a pair of side walls, end walls joined to said side walls to provide an enclosure, a roof covering said enclosure, and a plurality of partitions within said enclosure, some of said partitions being positioned substantially parallel to said side walls while others of said partitions are positioned transversely thereto, said partitions being arranged to form a plurality of separate feed areas, rest areas, and pathways for the hogs housed in said building, each of said feed areas, rest areas and pathways having at least one normally open access opening between it and each adjacent one of said areas and pathways so as to provide for free movement of a hog in any one of said areas or pathways directly into an adjacent one of said areas or pathways without passing through any other area or pathway.

2. The hog finishing building of claim 1 in which said feed areas are located centrally in said enclosure with said rest areas being located between said feed areas and said side walls.

3. The hog finishing building of claim 2 in which a pair of rest areas are formed by a first partition extending substantially parallel to said side walls and along a feed area and a second partition joined at one end to said first partition and extending transversely thereto toward a side wall.

4. The hog finishing building of claim 3 in which there are a pair of rest areas on each side of a feed area separated therefrom by said first partition, and a first pathway extends along each pair of rest areas between the rest areas and a side wall.

5. The hog finishing building of claim 4 in which there is an additional partition extending transversely to said first partition from said first pathway toward said feed area on each side of a rest area, said additional transverse partition being spaced longitudinally from the end of said first partition so as to provide a passageway from the rest area into the feed area.

6. The hog finishing building of claim 5 in which the additional transverse partition on each side of the feed area extends into the feed area toward the additional transverse partition on the other side of the feed area, said additional transverse partition terminating in a passageway between them which provides for movement of the hogs into and out of the feed area.

* * * * *